United States Patent
Bachmaier

(10) Patent No.: US 7,728,737 B2
(45) Date of Patent: Jun. 1, 2010

(54) SYSTEMS AND METHODS FOR OUTPUT OF INFORMATION MESSAGES IN A VEHICLE

(75) Inventor: Peter Bachmaier, Grossnoebach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 278 days.

(21) Appl. No.: 11/710,949

(22) Filed: Feb. 27, 2007

(65) Prior Publication Data

US 2007/0200732 A1    Aug. 30, 2007

(30) Foreign Application Priority Data

Feb. 28, 2006    (DE) ................... 10 2006 009 091

(51) Int. Cl.
*G08G 1/123* (2006.01)
*G01C 21/00* (2006.01)

(52) U.S. Cl. .................. 340/995.24; 340/996; 701/213

(58) Field of Classification Search ...... 340/995.1–996; 455/456.1–456.3; 701/209–211, 213, 214
See application file for complete search history.

(56) References Cited

U.S. PATENT DOCUMENTS

| 5,627,549 | A | 5/1997 | Park | |
| 6,496,116 | B2* | 12/2002 | Farringdon et al. | 340/573.1 |
| 6,571,168 | B1* | 5/2003 | Murphy et al. | 701/123 |
| 6,584,403 | B2* | 6/2003 | Bunn | 701/213 |
| 6,810,323 | B1 | 10/2004 | Bullock et al. | |
| 7,071,842 | B1* | 7/2006 | Brady, Jr. | 340/988 |
| 7,082,365 | B2* | 7/2006 | Sheha et al. | 701/209 |
| 7,394,405 | B2* | 7/2008 | Godden | 340/996 |
| 2002/0152025 | A1 | 10/2002 | Shimada | |
| 2003/0036848 | A1 | 2/2003 | Sheha et al. | |
| 2006/0058955 | A1* | 3/2006 | Mehren | 701/209 |
| 2006/0271286 | A1* | 11/2006 | Rosenberg | 701/211 |
| 2006/0293849 | A1* | 12/2006 | Baldwin | 701/213 |
| 2007/0072620 | A1* | 3/2007 | Levitan | 455/456.1 |

FOREIGN PATENT DOCUMENTS

| DE | 199 16 967 C1 | 11/2000 |
| DE | 199 38 261 A1 | 2/2001 |
| DE | 101 46 897 A1 | 7/2002 |
| DE | 101 51 366 A1 | 10/2002 |
| EP | 0 995 973 B1 | 4/2000 |
| EP | 1 045 224 A | 10/2000 |
| EP | 1 111 340 A2 | 6/2001 |
| GB | 2 370 708 A | 7/2002 |

OTHER PUBLICATIONS

German Search Report dated Sep. 11, 2006 including English translation (Nine (9) pages).
European Search Report dated Oct. 28, 2009.

* cited by examiner

*Primary Examiner*—Jennifer Mehmood
(74) *Attorney, Agent, or Firm*—Crowell & Moring LLP

(57) ABSTRACT

A method and system is provided for the output of an information message in a vehicle, whereby an information message is stored, the current location of the vehicle is determined, a driver of the vehicle triggers an assignment of a stored information message to a location, and the information message assigned to a location is automatically emitted when the vehicle is situated at this location.

11 Claims, 2 Drawing Sheets

SYSTEMS AND METHODS FOR OUTPUT OF INFORMATION MESSAGES IN A VEHICLE

BACKGROUND AND SUMMARY OF THE INVENTION

This application claims the priority of German Application No. 10 2006 009 091.8, filed Feb. 28, 2006, the disclosure of which is expressly incorporated by reference herein.

The invention relates to a method and system for the input of an information message in a vehicle, and to a correspondingly equipped vehicle.

Vehicles with navigation systems are known, in which an indicating device is controlled as a function of the currently determined location of the vehicle. For example, an intersection is shown on the indicating device when the vehicle is located in proximity of the intersection. When the routing system is activated, the correct route is additionally illustrated in a highlighted manner—superimposed on the display of the intersection. In addition, it is known to inform the driver acoustically of the correct route by the output of a corresponding voice message. In this case, the output of information is based on information stored in a read-only manner, for example, on a DVD, which information—with the exception of the destination—cannot be changed by the driver.

Situations therefore occur, in which these known systems do not guide the driver corresponding to his individual wishes. The driver may, for example, at certain times, want to drive a route deviating from his customary route (when the routing system is deactivated) or drive a route deviating from the route which was suggested by the navigation system (while the routing system is activated). Reasons for this deviation may be a temporary construction site; an errand which always has to be run on a certain weekday; a special traffic situation occurring only at certain times, or a driver's personal preference for certain routes at certain times.

It is, therefore, an object of the invention to provide a system and method which makes it easier for a driver of a vehicle to drive the route desired by him.

This object is achieved by a method for the output of an information message in a vehicle, and a correspondingly equipped vehicle system, in which method an information message is stored, and the current location of the vehicle is determined. A driver of the vehicle triggers an assignment of a stored information message to a location. The information message assigned to a location is automatically emitted when the vehicle is situated at this location.

Advantageous further developments of the invention are described and claimed herein.

The invention is, therefore, also based on the idea of reminding the driver at certain locations to drive a different route which deviates from his customary route or from the route suggested by the navigations system, specifically the route that most corresponds to his individual wishes. These wishes may be a function of the time or of the situation.

For this purpose, the driver sets up or triggers an assignment of a reminder or information message to be emitted to a location where he is to be reminded or where the information message is to be emitted. The reminder or the output of an information message will then take place automatically when the vehicle is situated at the location or in the proximity of the location which is assigned to the information message.

The driver is thereby enabled to set a reminder point, which links a certain location with an information message. Based on this stored reminder point, the output of the corresponding, preferably location-dependent, information message will then take place when the vehicle is again situated in this location.

The information message or several information messages are stored or intermediately stored in a storage device. The information messages may be acoustic, optical and/or haptic signals (or indications which are, for example, preset by a vehicle manufacturer or are selected or generated by the driver). An information message preferably includes a voice message generated by the driver. However, the invention also contemplates the generating and output of single signal tones as information messages.

In order to adapt the automatic output of such a location-dependent reminder or information message as easily as possible to the wishes of the vehicle driver or to make the setting of such a reminder by the driver as simple, comfortable, and intuitive as possible, it is preferably provided that, during the drive, the driver himself triggers or establishes the assignment of an information message to the location at which the information message is to be emitted, by actuating an actuating element. With the actuating of the actuating element, an information message is automatically assigned to the currently determined location of the vehicle, thus to the location of the vehicle at the point in time of the actuating of the actuating element. In order to make the triggering of an assignment of an information message particularly comfortable and ergonomic, it is preferably provided that the actuating element is a rotary push button, particularly a rotary push button which is already present anyhow for operating another device, for example, a navigation system or an audio system.

The information message to be assigned is preferably selected, generated or entered beforehand by use of the actuating element. Particularly preferably, with the actuating of an actuating element, a voice recording device is activated in order to thereby input and store an information message by using the voice of the driver, and simultaneously the assignment of this information message to the currently determined location is triggered.

The location to which an information message is assigned may be the current location of the vehicle, a location in proximity of the current location of the vehicle, or a location which has a fixed local or time-related relationship with the current location of the vehicle. For this purpose, preferably the routes driven by the vehicle are intermediately stored for a preset past time period.

By actuating an actuating element, preferably that location, which is situated before the current location in the driving direction by a given distance or a given driving distance or a given driving time (when a given speed or the current speed is assumed), is automatically assigned to an information message. An actuating or a delayed actuating of an actuating element for triggering an assignment of a location to an information message, for example, only after or directly at a turn-off point to be selected, may nevertheless have the result that, during the next traveling of the route, the corresponding information message is emitted on time, for example, before the turn-off point to be selected. Thus, after the reminder by the information message, the driver will have sufficient time in order to, for example, change a driving lane, actuate a turn signal, and prepare himself for the turn off from the customary route or the route suggested by the navigation system.

In addition to the assignment of a location to an information message, it is preferably provided to also assign a driving direction to the information message. This is preferably an automatically determined current driving direction of the vehicle when triggering the assignment of a location and of the driving direction to an information message, particularly the automatically determined current driving direction of the vehicle when actuating the actuating element. As a result, it becomes possible to automatically emit the reminder or the information message not only at the correct location but also only when the vehicle is in the appropriate driving direction, specifically essentially in the stored driving direction assigned to the information message.

The driving direction to which an information message is assigned may be the current driving direction of the vehicle or a driving direction which the vehicle had at a location which is in a fixed preset local or time-related relationship with respect to the current location of the vehicle. For this purpose, the driving directions of the vehicle are preferably intermediately stored for a given past time period.

The information message is preferably not emitted when the vehicle is not situated at the location and/or is not situated in the driving direction which is assigned to the information message.

The information message is particularly preferably only emitted when a routing module of a navigation system integrated in the vehicle is deactivated.

The object on which the invention is based is preferably also achieved by a vehicle having a location determination device, such as a GPS (Global Positioning System) receiver, for the determination of the current location of the vehicle, having a storage device for storing at least one information message, having an input device for triggering the assignment of a stored information message to a location, and having an output device for the emission of an information message. A control device, which interacts or is connected with the above-mentioned components, is set up such that the information message assigned to a location is automatically emitted when the vehicle is situated in this location. The current driving direction is preferably determined by use of the location determination device or by use of a driving direction determination device.

Other objects, advantages and novel features of the present invention will become apparent from the following detailed description of the invention when considered in conjunction with the accompanying drawings.

DETAILED DESCRIPTION OF THE DRAWINGS

Figure 1:
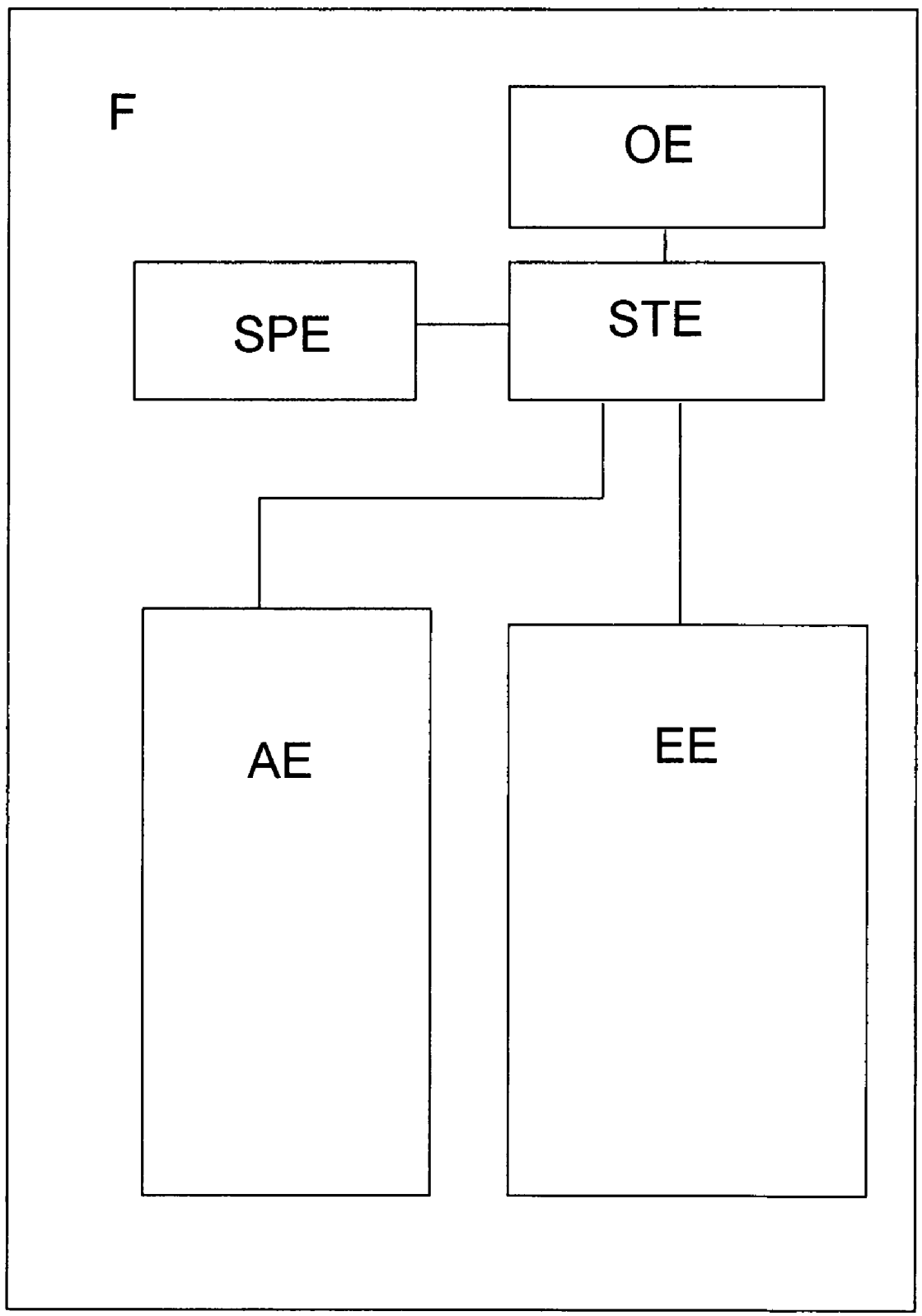
FIG. 1 is a schematic block diagram of a vehicle having a location determination device.

FIG. 1 illustrates a vehicle F having a location determination device OE, which is based, for example, on a satellite-supported positioning system, and may be a component of a navigation system integrated in the vehicle F. During the drive, the location determination device OE automatically and continuously determines the location and the driving direction of the vehicle F.

In addition, an input device EE is provided, which may comprise an actuating element, such as a key, a rotary button, a push button, a lever, a rocker, or the like. By use of the input device EE, the driver or another vehicle occupant can select or input an information message, can select or input a location, and can trigger the assignment of the location to the information message which is to be emitted at that location, particularly can initiate the storage of this assignment.

The information message can be emitted by way of an output device AE, such as a loudspeaker, a display, a signal light, or the like The entered or preset information messages, locations, driving directions and assignments between locations, driving directions and information messages can be stored in a correspondingly coded form in the storage device SPE, such as a semiconductor-based storage element. Within the scope of the invention, an information generator, a signal storage device, or a signal generator are also called storage devices.

A control device STE couples the above-mentioned components with one another, triggers the components, and controls the process steps explained in the following. The control device STE may be constructed as a program-controlled processor device or as an application-specific integrated circuit (ASIC) and is further developed such that the information message assigned to a location and a driving direction is automatically emitted when the vehicle is situated at the corresponding location in the corresponding driving direction.

Figure 2:
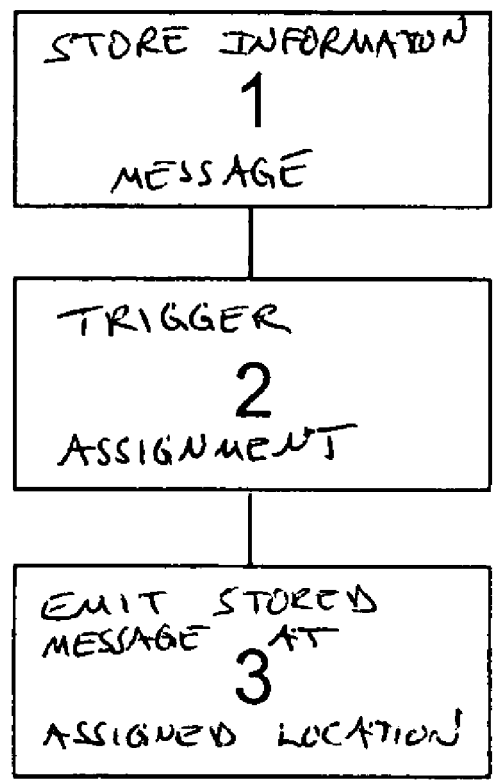
FIG. 2 is a flow chart of a method for the output of an information message in a vehicle.

FIG. 2 illustrates an example of a method for the output of an information message.

In a first Step 1, a driver stores an information message, for example, by way of an audio message receiving device (input device) in the storage device. For example, after actuating a corresponding actuating element, the driver speaks the information message "gas station", whereupon correspondingly coded information is stored in the storage device.

In a second Step 2, the driver actuates an actuating element during the drive on his customary driving route at a turn-off which, deviating from his customary driving route, leads to his customary gas station, whereupon the current location of the vehicle (turn-off to the gas station), for example, in the form of coordinates, and the current driving direction of the vehicle are assigned to the information message "gas station", and this assignment is stored in the storage device. If several information messages are stored in the storage device, the driver selects the information message "gas station" which is to be assigned to the current location of the vehicle (turn-off to the gas station).

As an alternative thereto, a location assigned to the information message is stored, which location is in a preset local or time-related relationship (for example, 200 meters before the turn-off to the gas station in the driving direction) with respect to the current location of the vehicle (turn-off to the gas station).

An embodiment is particularly preferred in which the first two steps are triggered together by actuating an actuating element only once. The actuating of an actuating element therefore starts the receiving device for receiving or storing the information message and triggers the assignment of the information messages spoken thereon by the driver to the current location or to the location which is in a preset local or time-related relationship with respect to the current location of the vehicle.

In a third Step 3, the information message "gas station" is automatically emitted by means of loudspeakers during the drive on the above-mentioned customary route, for example, a week later, when the vehicle is in the proximity of the location or at the location which is stored as being assigned to the information message "gas station", and when the vehicle is moving in the driving direction which is stored as being assigned to the information message "gas station". As a result, the driver is reminded, if required, to use the turn-off leading to the gas station. Whether the vehicle is at the corresponding location or in proximity of the corresponding location can be determined by way of a distance determination between the current location and the location assigned to the information message and a comparison between the determined distance and a preset threshold value.

A further development of the invention is particularly preferable in which an automatic output of an information message depends not only on the current location of the vehicle and/or the current driving direction of the vehicle, but also on meeting a further vehicle-related, environment-related, or time-related criterion, such as a falling below a predefined fuel tank level,
a specified day of the week,
a specified time of day,
a specified temperature range,
a specified brightness range,
a specified seat occupation, or
a specified combination of the above-mentioned criteria.

Preferably, when the actuating element is actuated, the current parameter on which this criterion is based or the current parameters on which these criteria are based are automatically recorded and stored for this purpose while being assigned to the information message.

When the vehicle is then later situated at a location and in a driving direction assigned to an information message, it is checked by means of recording the corresponding parameters whether the further criterion assigned to the information message (or the further criteria assigned to the information message) has/have been met, and the information message is then only emitted if the criterion or criteria is/are met.

For example, the driver will only be reminded of the turn-off to his gas station if the vehicle is in proximity of the turn-off and, in addition, the fuel tank level has fallen below a predefined threshold value.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for outputting an information message in a vehicle, the method comprising the acts of:
   storing the information message for subsequent output;
   determining a current location of the vehicle;
   triggering, by a driver of the vehicle during a drive of the vehicle:
      determining a location for the vehicle of the vehicle;
      selecting a vehicle related criterion for the vehicle for automatically emitting the stored message, wherein the vehicle related criterion for the vehicle is one of a specified seat occupation of the vehicle and a fuel tank level of the vehicle being below a predefined level;
      an assignment of the stored information message to the location and an assignment of the selected vehicle related criterion to the stored information message; and
   automatically emitting the stored information message assigned to the location when the vehicle is situated at the location during a subsequent drive of the vehicle only when the selected vehicle related criterion is met.

2. The method according to claim 1, further comprising the act of one of generating, entering and selecting the information message to be stored by a driver of the vehicle.

3. The method according to claim 1, wherein the act of triggering, by the driver of the vehicle, the assignment of the stored information message to the location is performed by the driver during a drive of the vehicle via actuation of an actuating element in the vehicle.

4. The method according to claim 1, wherein the act of triggering an assignment of the stored information message to a location is carried out by assigning the stored information message to the location, wherein the location is in a predefined local or time-related relationship with respect to a currently determined location of the vehicle at the triggering of the assignment, the assignment being triggered by the driver during the drive via actuation of an actuating element in the vehicle.

5. The method according to claim 1, wherein the act of triggering the assignment of the stored information message to a location is performed by assigning the information message to the location of the vehicle, which location is entered via an input device.

6. The method according to claim 2, wherein the act of triggering the assignment of the stored information message to a location is performed by assigning the information message to the location of the vehicle, which location is entered via an input device.

7. A method for outputting an information message in a vehicle, the method comprising the acts of:
   storing the information message for subsequent output;
   determining a current location of the vehicle;
   determining a driving direction of the vehicle;
   triggering, by a driver of the vehicle during a drive of the vehicle the acts of:
      determining a location for the vehicle of the vehicle; and
      an assignment of the stored information message to the location and an assignment of the driving direction of the vehicle to the stored information message; and
   automatically emitting the stored information message assigned to the location and the driving direction of the vehicle when the vehicle is situated at the location during a subsequent drive of the vehicle only when the vehicle is moving in the driving direction assigned to the stored information message.

8. A vehicle system, comprising:
   a location determination device for determining a current location of a vehicle;
   a storage device for storing an information message;
   an input device for triggering, during a first drive of the vehicle a determination of a location for the vehicle, a determination of the driving direction of the vehicle, and an assignment of a stored information message to the driving direction of the vehicle during the first drive and to the determined location;
   an output device for outputting an information message; and
   a control device operatively configured to automatically emit the stored information message assigned to the location when the vehicle is situated at the location during subsequent drive of the vehicle only when the vehicle is moving in the same direction as the driving direction to which the information message is assigned.

9. The vehicle system according to claim 8, wherein the control device is operatively configured to assign the stored information message, based on an input from the input device, to a location which is in a predefined local or time-related relationship with respect to a currently determined location of the vehicle output from the location determination device.

10. The method according to claim 1, wherein storing the information message for subsequent output is performed by receiving a voice recording of content for the information message from the driver of the vehicle.

11. The method according to claim 10, wherein the receiving a voice recording includes starting a receiving device to receive the voice recording in response to an actuation of an actuating element in the vehicle, and wherein triggering, by a driver of the vehicle of an assignment of the stored information message to the location is performed by triggering the assignment of the stored information message to the location in response to the same actuation of the actuating element.

* * * * *